US010845208B2

(12) United States Patent
McAlpine et al.

(10) Patent No.: US 10,845,208 B2
(45) Date of Patent: Nov. 24, 2020

(54) DETERMINING A DUMP LOCATION OF MATERIAL DUMPED BY A TRANSPORT VEHICLE

(71) Applicant: Caterpillar Paving Products Inc., Brooklyn Park, MN (US)

(72) Inventors: Jacob McAlpine, Otsego, MN (US); John Marsolek, Watertown, MN (US); Gautham Subramanian, Peoria, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 184 days.

(21) Appl. No.: 16/110,685

(22) Filed: Aug. 23, 2018

(65) Prior Publication Data

US 2020/0064145 A1 Feb. 27, 2020

(51) Int. Cl.
*G01C 21/34* (2006.01)
*G01C 21/36* (2006.01)
*G01S 19/42* (2010.01)

(52) U.S. Cl.
CPC ....... *G01C 21/3484* (2013.01); *G01C 21/343* (2013.01); *G01C 21/3676* (2013.01); *G01S 19/42* (2013.01)

(58) Field of Classification Search
CPC ............ G01C 21/3484; G01C 21/3626; G01C 22/00; G01C 21/343; G01C 21/3676; G05D 1/00; G01S 19/42
See application file for complete search history.

(56) References Cited

U.S. PATENT DOCUMENTS

| | | | |
|---|---|---|---|
| 8,930,092 B2* | 1/2015 | Minich | E01C 23/07 701/50 |
| 9,107,037 B2* | 8/2015 | Glachant | G06F 16/29 |
| 9,481,964 B1* | 11/2016 | Marsolek | G01S 19/14 |
| 2012/0288328 A1* | 11/2012 | Minich | E01C 19/23 404/72 |
| 2013/0290062 A1* | 10/2013 | Patel | G06Q 10/06313 705/7.23 |
| 2017/0058467 A1* | 3/2017 | Marsolek | E01C 19/48 |
| 2017/0060126 A1* | 3/2017 | Marsolek | E01C 19/48 |
| 2017/0205814 A1* | 7/2017 | Marsolek | G07C 5/0841 |
| 2017/0205999 A1* | 7/2017 | Marsolek | G07C 5/0808 |
| 2017/0228108 A1* | 8/2017 | Marsolek | G06F 3/04847 |

* cited by examiner

*Primary Examiner* — Abdhesh K Jha

(57) ABSTRACT

Systems and methods for estimating a dump location of material dumped by a transport vehicle are disclosed. A system may receive information that identifies a location of a paving machine, and may receive multiple data points associated with the transport vehicle. Each data point may indicate a respective location of the transport vehicle and a corresponding time at which the transport vehicle was at the respective location. The system may identify a subset of the multiple data points that indicate respective locations of the transport vehicle within a threshold proximity of the location of the paving machine. The system may estimate the dump location of the material dumped by the transport vehicle based on at least one of a set of locations indicated by the subset of data points or a set of times indicated by the subset of data points, and may output information that identifies the dump location.

20 Claims, 5 Drawing Sheets

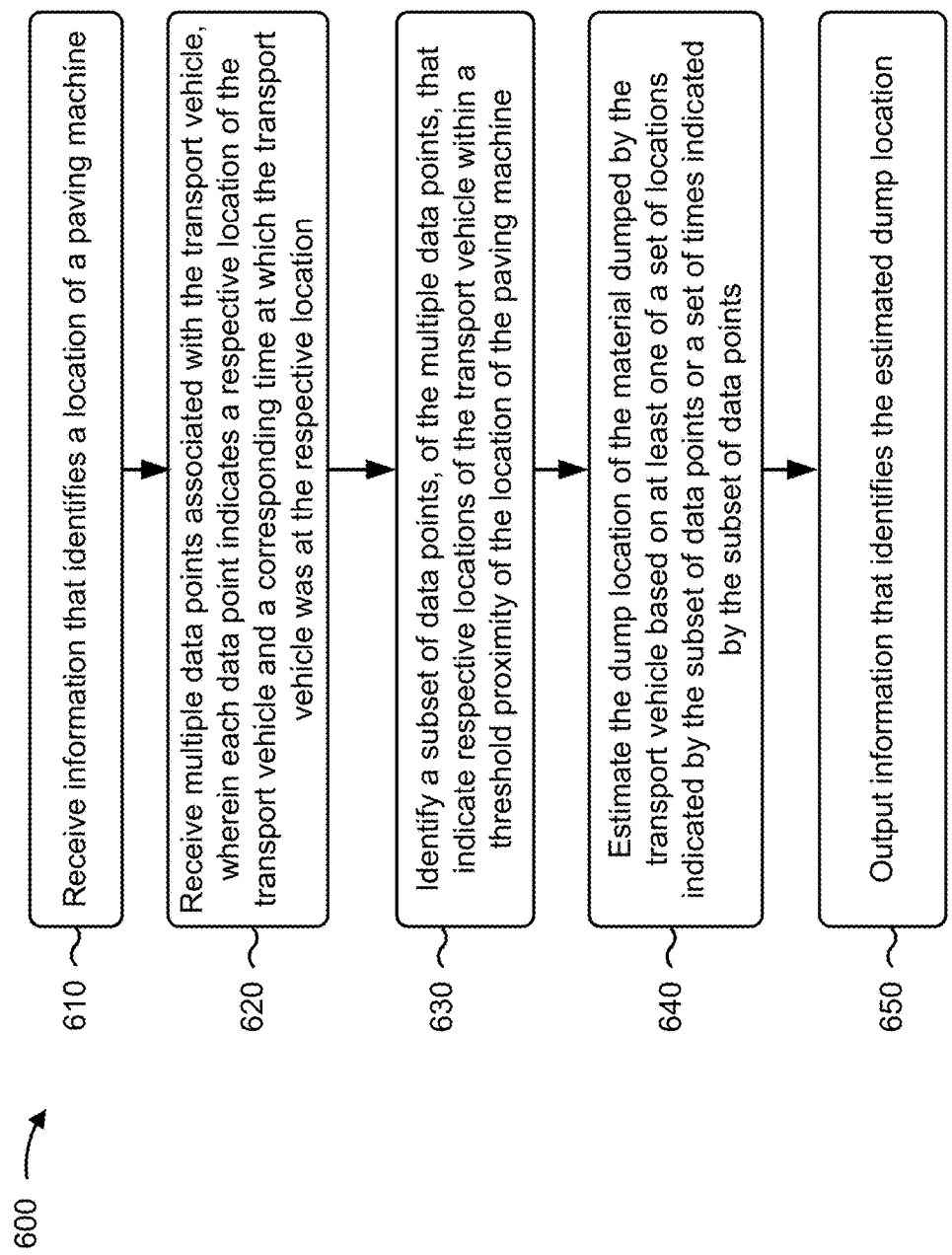

DETERMINING A DUMP LOCATION OF MATERIAL DUMPED BY A TRANSPORT VEHICLE

TECHNICAL FIELD

The present disclosure relates generally to systems and methods for determining a dump location and, more particularly, to system and methods for determining a dump location of material dumped by a transport vehicle.

BACKGROUND

A paving machine may be used to lay a bituminous roadway mat. A typical paving machine employs a screed assembly (sometimes referred to as a floating screed) for spreading and compressing a bituminous material to form a roadway mat with a smooth surface. After a roadway mat has been laid, various issues may later arise in the roadway mat, such as cracks, potholes, and/or the like. When such issues arise, it may be useful to use information associated with the laying of the roadway mat to identify potential root causes of these issues. However, such information may be difficult to accurately obtain on a busy project site.

One method and system for coordinating activities associated with paving a roadway is described in U.S. Patent Publication No. 2013/0290062 (the '062 publication) of Patel et al., which published on Oct. 31, 2013. The '062 publication describes a server that "receives a communication from [a] transport truck, indicating that [a] batch of paving material has been delivered to [a] roadway." "This communication may be initiated by the driver of the truck or may be generated automatically by [a] computer system monitoring the movement of the truck and determining when the truck has arrived at the roadway." However, this may be prone to operator error, and/or may be unable to identify a location along the roadway at which material was dumped by the truck.

The disclosed system is directed to overcoming one or more of the problems set forth above and/or other problems of the prior art.

SUMMARY

According to some implementations, the present disclosure is related to a method of estimating a dump location of material dumped by a transport vehicle. The method may include receiving information that identifies a location of a paving machine at a specific time; receiving multiple data points associated with the transport vehicle, wherein each data point indicates a respective location of the transport vehicle and a corresponding time at which the transport vehicle was at the respective location; identifying a set of data points, of the multiple data points, that indicate respective locations of the transport vehicle within a threshold proximity of the location of the paving machine within a time period that includes the specific time; estimating the dump location of the material dumped by the transport vehicle based on at least one of: a set of locations indicated by the set of data points, and a set of times indicated by the set of data points; and outputting information that identifies the estimated dump location.

According to some implementations, the present disclosure is related to a system for estimating a dump location of material dumped by a transport vehicle. The system may include a memory and one or more processors configured to receive information that identifies a location of a paving machine; receive multiple data points associated with the transport vehicle, wherein each data point indicates a respective location of the transport vehicle and a corresponding time at which the transport vehicle was at the respective location; identify a subset of data points, of the multiple data points, that indicate respective locations of the transport vehicle within a threshold proximity of the location of the paving machine; estimate the dump location of the material dumped by the transport vehicle based on at least one of: a set of locations indicated by the subset of data points, or a set of times indicated by the subset of data points; and output information that identifies the estimated dump location.

According to some implementations, the present disclosure is related to a non-transitory computer-readable medium storing one or more instructions for estimating a dump location of material dumped by a first vehicle. The one or more instructions, when executed by one or more processors, may cause the one or more processors to receive information that identifies a location of a second vehicle; receive multiple data points associated with the first vehicle, wherein each data point indicates a respective location of the first vehicle and a corresponding time at which the first vehicle was at the respective location; identify a subset of data points, of the multiple data points, that indicate respective locations of the first vehicle within a threshold proximity of the location of the second vehicle; estimate the dump location of the material dumped by the first vehicle based on at least one of: a set of locations indicated by the subset of data points, or a set of times indicated by the subset of data points; and output information that identifies the estimated dump location.

Other features and implementations of this disclosure will be apparent from the following description and the accompanying drawings.

BRIEF DESCRIPTION OF THE DRAWINGS

FIG. 5 is a diagram of an example process for determining a dump location of material dumped by a transport vehicle.

DETAILED DESCRIPTION

Figure 1:
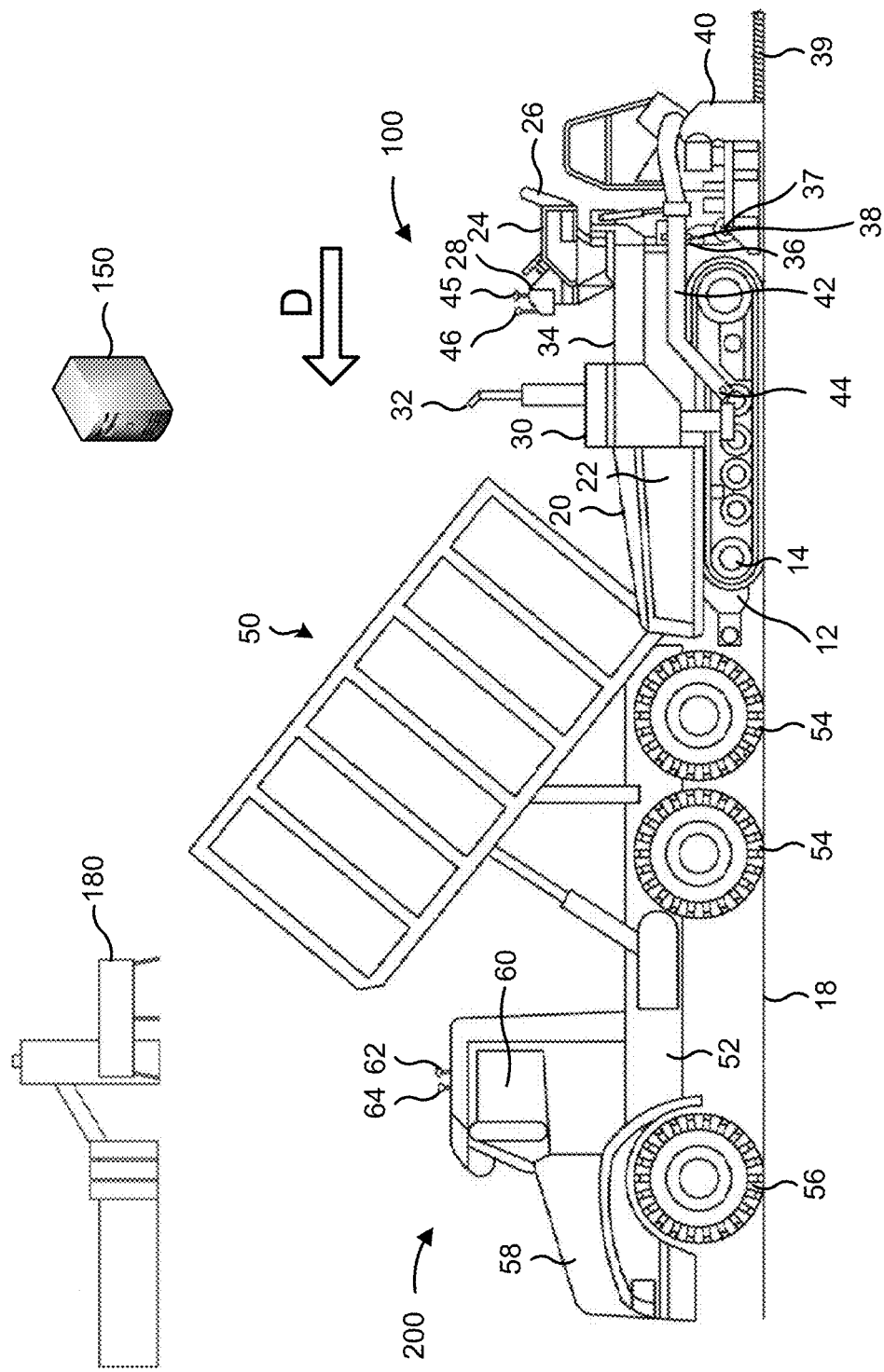
FIG. 1 is a diagram of an example paving machine and transport vehicle.

FIG. 1 is a diagram of an example paving machine 100 and transport vehicle 200. As shown, paving machine 100 may include a frame 12 that is supported by and transported upon a plurality of transport wheels or tracks 14 that transport the paving machine 100 in a direction D of travel or motion. A hopper 20 may be disposed on a forward portion of frame 12. Hopper 20 may include sides 22 extending vertically from frame 12 so that hopper 20 can receive material (e.g., bituminous aggregate material, such as asphalt and/or the like) from a transport vehicle 200 (e.g., a dump truck, a haul truck, an asphalt truck, and/or the like) and retain the material in hopper 20 pending disposition of the material on a surface 18 to be paved by paving machine 100.

As shown, towards a rear of the frame 12, an operator station 24 may be provided so that an operator, seated in a chair 26, can control operation of paving machine 100 by way of controls provided on a control panel 28. Also disposed toward the rear of the frame 12 may be an engine housing 30, on which is provided an exhaust stack 32 for exhausting combustion by-products of engine housing 30. A walkway area 34 may be provided to permit access by personnel (e.g., the operator, members of a paving crew, and/or the like) to paving machine 100.

As further shown in FIG. 1, a screed assembly 40 may be connected to frame 12 by a set of screed support arms 42. In some cases, the set of screed support arms 42 may be substantially parallel and horizontal to one another, extending along frame 12, and be pivotally connected to frame 12 by an arm pivot 44, which may include a horizontal axis transverse to the direction D of travel of paving machine 100, thus permitting vertical movement of screed assembly 40. While not shown, paving machine 100 may include an apparatus by which vertical movement of screed assembly 40 may be limited and/or controlled.

As further shown, paving machine 100 may further include an aggregate disposition apparatus 36. Aggregate disposition apparatus 36 may include an auger 37 (e.g., a flighted auger and/or the like) disposed adjacent a rear of frame 12 in an approximate horizontal and axially transverse position relative to the direction D of travel of paving machine 100. As further shown, an auger support member 38 may be arranged for controlling a position of aggregate disposition apparatus 36. As an example, auger 37 may include a flighted auger that provides at least two oppositely directed flights of material 39 from a centerline of paving machine 100, for directing a substantially equal amount of material 39 towards outer edges of screed assembly 40.

As further shown, paving machine 100 may include a GPS component 45 and/or one or more communication components 46. GPS component 45 may include, for example, a GPS antenna, a GPS receiver, and/or the like, and may be used to determine a location of the paving machine 100 (e.g., at a specific time). A communication component 46 may be used to communicate with a server 150 (e.g., via at least a wireless connection, such as a cellular network connection, a wireless local area network (WLAN) connection, and/or the like), such as to provide information that identifies the location (and/or the specific time). Additionally, or alternatively, a communication component 46 may be used to communicate with a transport vehicle 200 via a wireless connection, such as a cellular network connection, a WLAN connection (e.g., a Wi-Fi connection), a wireless personal area network (WPAN) connection (e.g., a Bluetooth connection), a radio frequency identifier (RFID) connection, an infrared connection, and/or the like.

Transport vehicle 200 may include, for example, an off-highway truck, a dump truck, a haul truck, and/or the like. As shown, the transport vehicle 200 may include a dumper body 50 and a frame 52 that supports a plurality of rear wheels 54 and a pair of front wheels 56. An engine compartment 58 and an operator cab 60 may be mounted at one end of the frame 52. An engine (not shown) and a transmission (not shown) may be mounted within the engine compartment 58.

The dumper body 50 may include a box portion and a skeletal structure. The dumper body 50 may comprise steel, aluminum, and/or the like. The box portion may define an inside surface and an outside surface (e.g., of a bed plate, or multiple bed plates, that form a base or a floor of the box portion). The box portion may include two side walls (e.g., a first side wall and a second side wall) and a front wall positioned between the first side wall and the second side wall toward the end of the transport vehicle 200 that includes the engine compartment 58 and/or the operator cab 60. In some implementations, the dumper body 50 may include a tailgate to prevent payload (e.g., material) from spilling from dumper body 50 during transport. The tailgate may be configured to move between an open position and a closed position. The tailgate may be positioned in the box portion toward another end of the transport vehicle 200 away from the end that includes the engine compartment 58 and/or the operator cab 60 (e.g., that is the dumping end of the dumper body 50). In the extended position, a front end of dumper body 50 may be raised for ejecting payload from the box portion of dumper body 50. The retracted position may be utilized for loading payload into the box portion of dumper body 50 and/or for hauling the payload.

As further shown, transport vehicle 200 may include a GPS component 62 and/or one or more communication components 64. GPS component 62 may include, for example, a GPS antenna, a GPS receiver, and/or the like, and may be used to determine a location of the transport vehicle 200 (e.g., at a specific time). A communication component 64 may be used to communicate with a server 150 (e.g., via at least a wireless connection, such as a cellular network connection, a wireless local area network (WLAN) connection, and/or the like), such as to provide information that identifies the location (and/or the specific time). Additionally, or alternatively, a communication component 64 may be used to communicate with a paving machine 100 via a wireless connection, such as a cellular network connection, a WLAN connection (e.g., a Wi-Fi connection), a wireless personal area network (WPAN) connection (e.g., a Bluetooth connection), a radio frequency identifier (RFID) connection, an infrared connection, and/or the like.

In some implementations, material may be loaded onto transport vehicle 200 at a material plant 180. Transport vehicle 200 may haul the material to a job site, such as a paving site where a paving machine 100 is laying roadway. The transport vehicle 200 may dump the material into a hopper 20 of paving machine 100 so that the material may be laid.

As indicated above, FIG. 1 is provided as an example. Other examples are possible and may differ from what was described in connection with FIG. 1.

Figure 2:
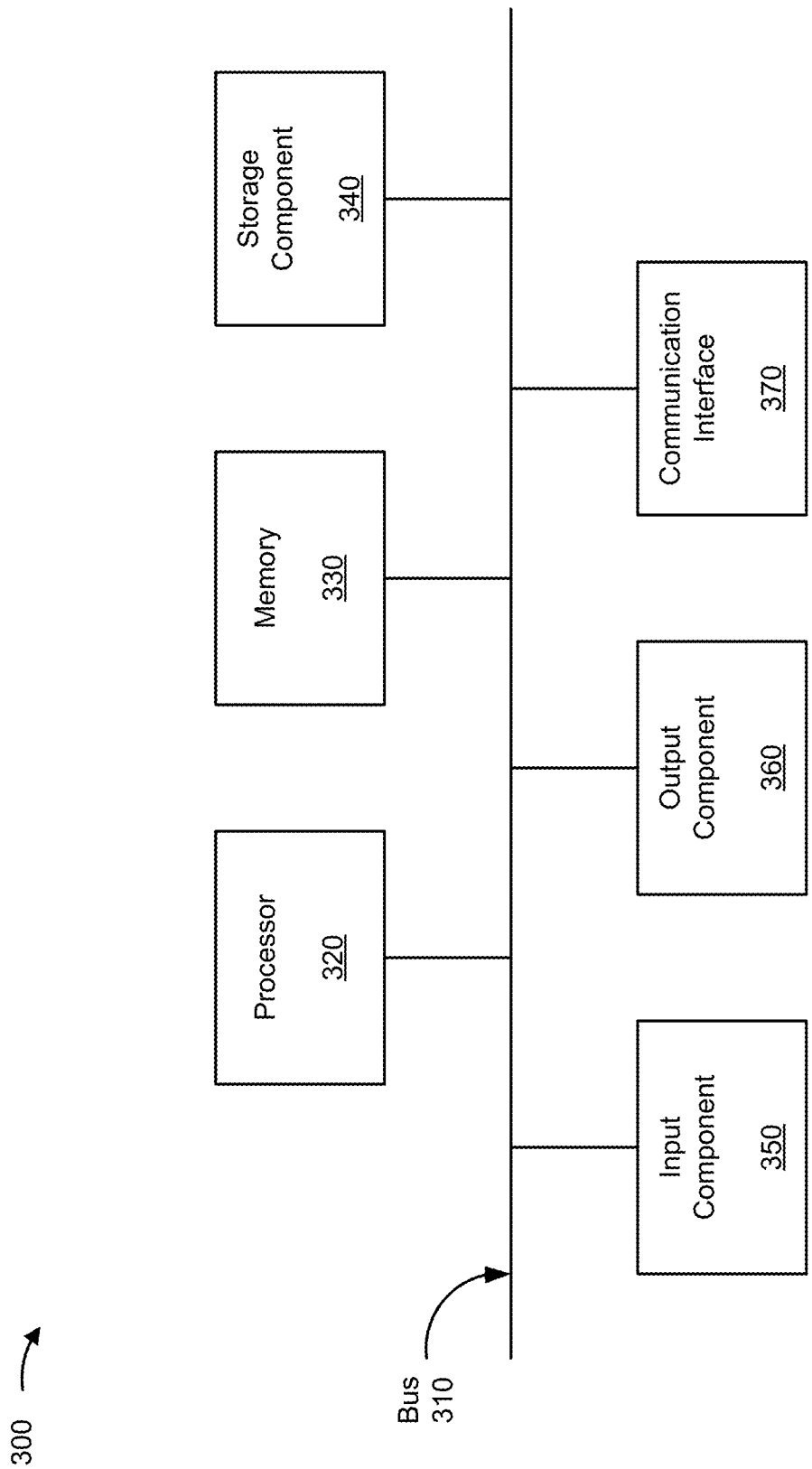
FIG. 2 is a diagram of an example system for determining a dump location of material dumped by a transport vehicle.

FIG. 2 is a diagram of an example system 300 for determining a dump location of material dumped by a transport vehicle. System 300 may correspond to server 150, which may include one or more systems 300 and/or one or more components of system 300. As shown in FIG. 2, system 300 may include a bus 310, a processor 320, a memory 330, a storage component 340, an input component 350, an output component 360, and a communication interface 370.

Bus 310 includes a component that permits communication among the components of system 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of system 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits system 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from system 300 (e.g., a display, a speaker, and/or one or more light-emitting diodes (LEDs)).

Communication interface 370 includes a transceiver-like component (e.g., a transceiver and/or a separate receiver and transmitter) that enables system 300 to communicate with other devices, such as via a wired connection, a wireless connection, or a combination of wired and wireless connections. Communication interface 370 may permit system 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, or the like.

System 300 may perform one or more processes described herein. System 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software. In some implementations, one or more components of system 300 may act as means for performing one or more process described herein, such as process 600 of FIG. 5 and/or the like.

The number and arrangement of components shown in FIG. 2 are provided as an example. In practice, system 300 may include additional components, fewer components, different components, or differently arranged components than those shown in FIG. 2. Additionally, or alternatively, a set of components (e.g., one or more components) of system 300 may perform one or more functions described as being performed by another set of components of system 300.

Figure 3:
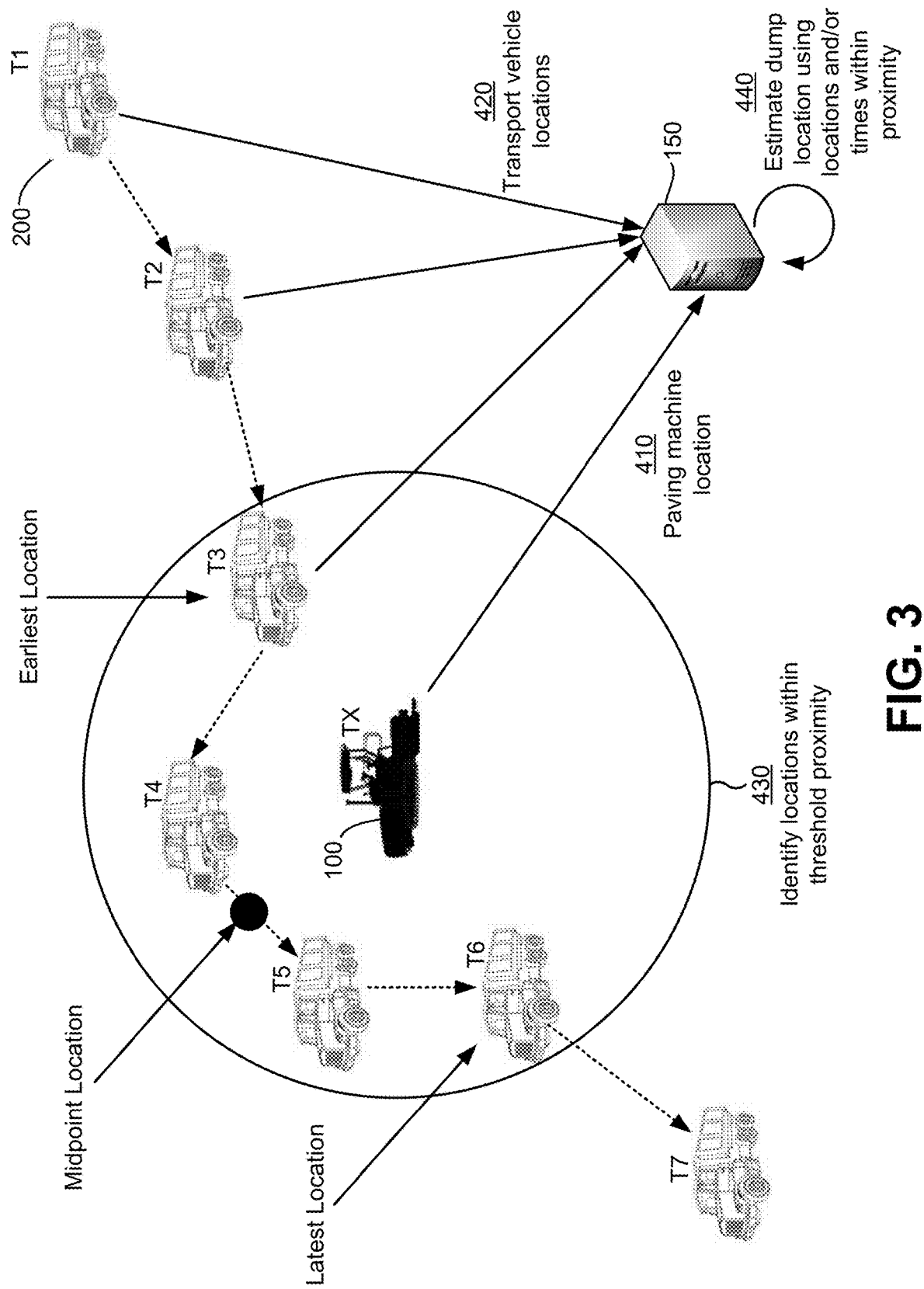
FIG. 3 is a diagram of example operations performed by one or more machines and/or systems of FIGS. 1-2.

FIG. 3 is a diagram of example operations performed by one or more machines and/or systems of FIGS. 1-2.

As shown by reference number 410, the server 150 may receive, from the paving machine 100 (e.g., via one or more wired and/or wireless connections), information that identifies a location of the paving machine 100. The paving machine 100 may be located at the location at a specific time (shown as TX), and the specific time may be indicated to the server 150. For example, the paving machine 100 may transmit a data point (e.g., a GPS data point) to the server 150, and the data point may indicate the location of the paving machine 100 at the specific time.

In some implementations, the paving machine 100 may periodically transmit such data points to the server 150 (e.g., every 10 seconds, every 30 seconds, every 1 minute, and/or the like). Additionally, or alternatively, the paving machine 100 may transmit such a data point to the server 150 based on detecting an event, such as detecting operator input to transmit the data point, detecting a paving operation, detecting a transport vehicle 200 within a threshold proximity of the paving machine 100 (e.g., with a threshold distance and/or within communicative proximity of the paving machine 100), detecting material being loaded on the paving machine 100, and/or the like.

As shown by reference number 420, the server 150 may receive, from the transport vehicle 200 (e.g., via one or more wired and/or wireless connections), information that identifies multiple locations of the transport vehicle 200 over time. The transport vehicle 200 may be located at a first location at a first time (shown as T1), may be located at a second location at a second time (shown as T2), and so on (e.g., for times T3 through T7). In some implementations, both the locations and the corresponding times may be indicated to the server 150. For example, the transport vehicle 200 may transmit multiple data points (e.g., a GPS data points) to the server 150, and each data point may indicate a respective location of the transport vehicle 200 at a respective time that corresponds to the respective location.

In some implementations, the transport vehicle 200 may periodically transmit such data points to the server 150 (e.g., every 10 seconds, every 30 seconds, every one minute, and/or the like). Additionally, or alternatively, the transport vehicle 200 may transmit such a data point to the server 150 based on detecting an event, such as detecting operator input to transmit the data point, detecting a dumping operation, detecting a paving machine 100 within a threshold proximity of the transport vehicle 200 (e.g., with a threshold distance and/or within communicative proximity of the transport vehicle 200), detecting material being dumped from the transport vehicle 200, and/or the like.

As shown by reference number 430, the server 150 may identify locations of the transport vehicle 200 that are within a threshold proximity of the paving machine 100. For example, the server 150 may identify a set of data points, of the multiple data points received from the transport vehicle 200, that indicate respective locations of the transport vehicle 200 that are within a threshold proximity (e.g., 10 meters, 20 meters, 30 meters, and/or the like) of the location of the paving machine 100. Additionally, or alternatively, when the paving machine 100 is at the location at a specific time, the server 150 may identify data points that indicate respective locations of the transport vehicle 200 that are within the threshold proximity within a time period that includes the specific time (e.g., within a threshold time around the specific time associated with the location of the paving machine 100). Although the threshold proximity is shown as a circle, another shape may be used, such as a square, a rectangle, a trapezoid, and/or the like.

In some implementations, the server 150 may identify the locations of the transport vehicle 200 that are within the threshold proximity using the data points (e.g., GPS data points) received from both the transport vehicle 200 and the paving machine 100. For example, the server 150 may use a data point received from the paving machine 100 to determine a specific location of the paving machine 100 at a specific time, and may identify the locations reported by the transport vehicle 200 that are within a threshold proximity of the specific location (e.g., 10 meters, 20 meters, 30 meters, and/or the like) within a time period that includes the specific time (e.g., within 30 seconds, 1 minute, 3 minutes, 5 minutes, and/or the like, of the specific time). The server 150 may include all data points from the transport vehicle 200 that satisfy such a condition in the set of data points to be used to estimate the dump location.

Thus, the server 150 may compare locations and/or times reported by the paving machine 100 and locations and/or times reported by the transport vehicle 200 to identify the set of data points reported within the threshold proximity. As the paving machine 100 moves, a different location and time reported by the paving machine 100 may be used as a basis for the comparison described above.

Additionally, or alternatively, the server 150 may identify the locations of the transport vehicle 200 that are within the threshold proximity based on an indication that the paving machine 100 and the transport vehicle 200 are within communicative proximity of one another. For example, the paving machine 100 and the transport vehicle 200 may be equipped with a communication component, as described above in connection with FIG. 1. In this case, when the paving machine 100 and the transport vehicle 200 are close enough to detect one another via the communication component (e.g., when the paving machine 100 and the transport vehicle 200 are within communicative proximity of one another), the paving machine 100 and/or the transport vehicle 200 may indicate, to the server 150, that the paving machine 100 and the transport vehicle 200 are within communicative proximity of one another.

Similarly, when the paving machine 100 and the transport vehicle 200 can no longer detect one another via the communication component (e.g., when the paving machine 100 and the transport vehicle 200 are no longer within communicative proximity of one another), the paving machine 100 and/or the transport vehicle 200 may indicate, to the server 150, that the paving machine 100 and the transport vehicle 200 are no longer within communicative proximity of one another. The server 150 may determine a time period during which the paving machine 100 and the transport vehicle 200 are within communicative proximity of one another, and may include all data points received within that time period in the set of data points used to estimate the dump location.

As shown by reference number 440, the server 150 may estimate a dump location of material dumped by the transport vehicle 200 based on a set of locations and/or a set of times indicated by the identified set of data points. In some implementations, the server 150 may estimate the dump location by determining a first location, of the set of locations, associated with an earliest time of the set of times, shown in FIG. 3 as an earliest location at time T3. This earliest location may represent a first reported location of the transport vehicle 200 within the threshold proximity of the paving machine 100. In some aspects, the server 150 may use this earliest location as an estimated dump location.

Additionally, or alternatively, the server 150 may estimate the dump location by determining a second location, of the set of locations, associated with a latest time of the set of times, shown in FIG. 3 as a latest location at time T6. This latest location may represent a last reported location of the transport vehicle 200 within the threshold proximity of the paving machine 100. In some aspects, the server 150 may use this latest location as an estimated dump location.

Additionally, or alternatively, the server 150 may estimate the dump location as a midpoint between the first location and the second location, shown as a midpoint location estimated as a location of the transport vehicle 200 between times T4 and T5. In some implementations, the server 150 may estimate the midpoint location as a midpoint directly between the earliest location and the latest location (e.g., using a midpoint of a straight line between the two locations). Alternatively, as shown in FIG. 3, the server 150 may estimate the midpoint location as a midpoint along a path of the transport vehicle 200, as indicated by the reported locations of the transport vehicle 200 (e.g., using a midpoint of a set of lines or curves connecting all locations within the threshold proximity). In this way, the server 150 may determine a more accurate estimate of the dump location.

Additionally, or alternatively, the server 150 may estimate the dump location by determining a time, of the set of times, that is a midpoint of the set of times. In some implementations, if the transport vehicle 200 reports an odd number of data points within the threshold proximity, then the server 150 may use a middle data point, of the odd number of data points, to estimate the dump location. For example, if the transport vehicle 200 reports five data points within the threshold proximity of the paving machine 100 (e.g., at times T10, T11, T12, T13, and T14), then the server 150 may identify the third reported data point (e.g., associated with time T12) as being associated with the midpoint of the set of times. The server 150 may determine a location, indicated in the third data point, that corresponds to the midpoint time, and may estimate the dump location as the location that corresponds to the midpoint time.

In some implementations, if the transport vehicle 200 reports an even number of data points within the threshold proximity, then the server 150 may use the two middle data points, of the even number of data points, to estimate the dump location. For example, as shown in FIG. 3, if the transport vehicle 200 reports four data points within the threshold proximity of the paving machine 100 (e.g., at times T3, T4, T5, and T6), then the server 150 may estimate the dump location as a location that is a midpoint between a location reported in the second reported data point (e.g., associated with time T4) and a location reported in the third reported data point (e.g., associated with time T5).

Additionally, or alternatively, the server 150 may estimate the dump location as a weighted combination of the set of location and/or the set of times reported within the threshold proximity. For example, a larger weight may be applied to reported locations that are clustered together (e.g., within another threshold proximity of one another), which may indicate that the transport vehicle 200 was near a particular location for several reported data points, which may indicate that a dump operation was occurring at or near the particular location. Conversely, a smaller weight may be applied to reported locations that are not clustered together. Additionally, or alternatively, a larger weight may be applied to reported locations that are evenly spaced, which may indicate that a dump operation was occurring (e.g., because the paving machine 100 may push the transport vehicle 200 at a steady speed during the dump operation). Conversely, a smaller weight may be applied to reported location that are not evenly spaced. Additionally, or alternatively, a larger weight may be applied to locations closer to the center of the threshold proximity (e.g., where the transport vehicle 200 is more likely to be engaging the paving machine 100 for a dump operation), and/or a smaller weight may be applied to locations closer to the edge of the threshold proximity (e.g., where the transport vehicle 200 is less likely to be engaging the paving machine 100 for a dump operation). In this way, the server 150 may determine a more accurate estimate of the dump location.

In some implementations, the server 150 may use machine learning to estimate the dump location. For example, the server 150 may receive operator input identifying an actual dump location, and may modify one or more weights to be applied to reported locations and/or times to match the estimated dump location with the actual dump location. Such operator input may be used to train a machine learning model to determine a combination of weights, equations, functions, and/or the like to be applied to reported times and/or locations, and such weights may be applied to other reported times and/or locations (e.g., without corresponding operator input) to estimate a dump location.

In some implementations, the server 150 may estimate a dump location based on one or more other (e.g., surrounding) dump locations (e.g., estimated or actual). For example, dump locations may be substantially evenly spaced, and the server 150 may use an assumption of such even spacing to estimate a dump location in relation to another dump location. Additionally, or alternatively, the server 150 may estimate a dump location based on a volume of material loaded onto a transport vehicle 200 (e.g., determined based on plant data). For example, a large volume of material may result in an estimated dump location that is further from a previous dump location as compared to a small volume of material. In this way, the server 150 may improve the accuracy of the estimated dump location.

In some implementations, the server 150 may output information that identifies the estimated dump location. For example, the server 150 may output such information to a memory of the server 150 for storage and/or later retrieval. Additionally, or alternatively, the server 150 may output such information to indicate the estimated dump location on a map, as described in more detail below in connection with FIG. 4.

Additionally, or alternatively, the server 150 may output an alert to avoid an issue in laying material. For example, if a transport vehicle 200 loaded with an incorrect material enters the threshold proximity (e.g., which the server 150 may determine using plant data and/or the like), then the server 150 may output an alert regarding the incorrect material to, for example, a control panel of the transport vehicle 200, a control panel of the paving machine 100, a device associated with a supervisor and/or an operator on the job site, and/or the like.

Some methods and systems described above permit the server 150 to estimate a dump location of material without receiving an explicit indication (e.g., from the paving machine 100 and/or the transport vehicle 200) that the material has been dumped. In this way, each transport vehicle 200 that dumps material at a job site need not be equipped with a sensor that detects such dumping, thereby reducing the cost of laying roadway and/or obtaining information for analyzing the laying of the roadway.

Although FIG. 3 has been described in connection with a paving machine 100 and a transport vehicle 200, the methods and system described herein may be applied to determine locations associated with other types of machines and/or vehicles, such as a first vehicle (e.g., the transport vehicle 200 and/or a vehicle other than the transport vehicle 200) and a second vehicle (e.g., the paving machine 100 and/or a vehicle other than the paving machine 100).

As indicated above, FIG. 3 is provided as an example. Other examples are possible and may differ from what was described in connection with FIG. 3.

Figure 4:
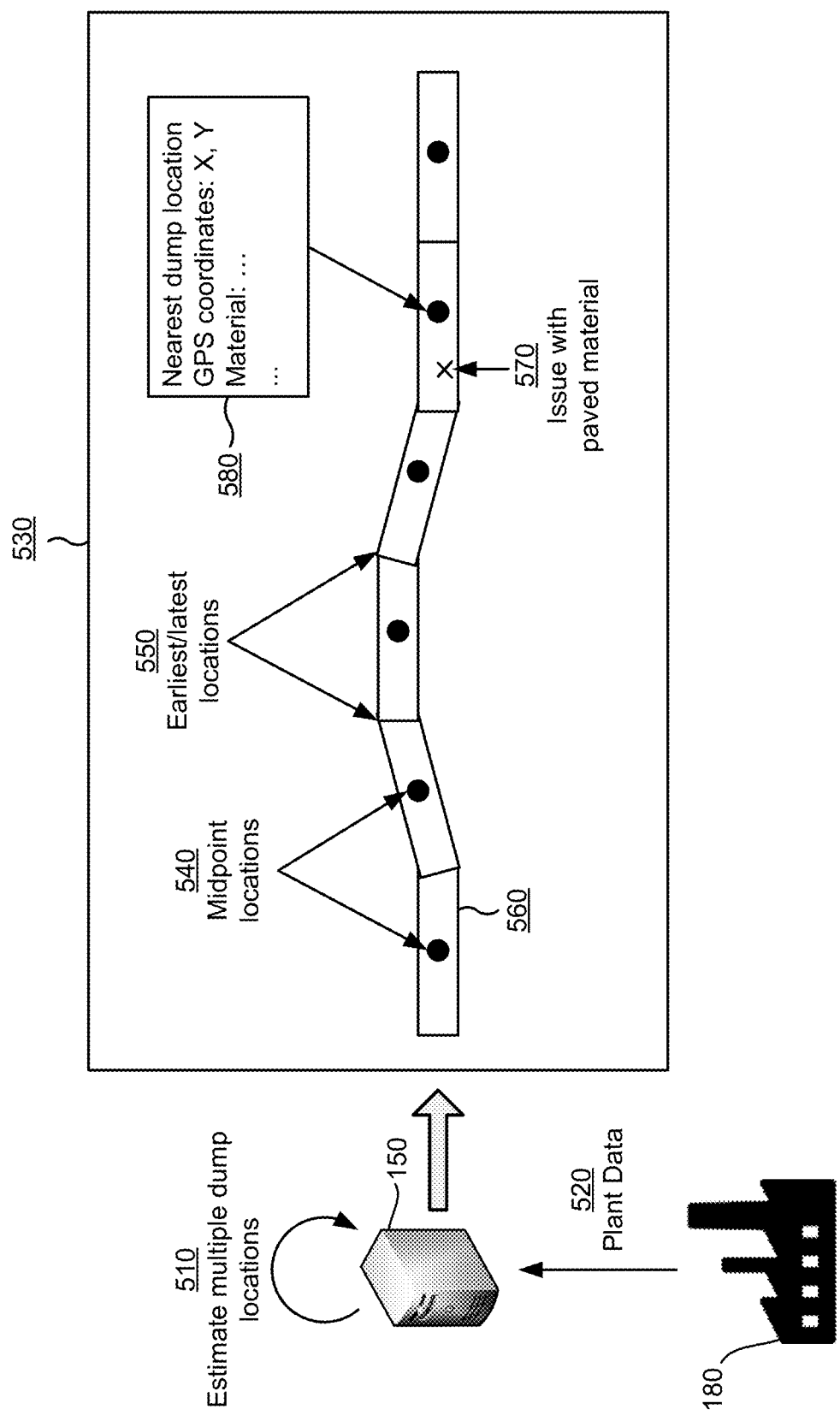
FIG. 4 is a diagram of example operations performed by the system of FIG. 2.

FIG. 4 is a diagram of example operations performed by the system of FIG. 2.

As shown by reference number 510, the server 150 (e.g., system 300) may estimate multiple dump locations associated with paving a roadway. One or more of these dump locations may be estimated as described above in connection with FIG. 3. In some implementations, different dump locations may be associated with material dumped by different transport vehicles 200. For example, multiple transport vehicles 200 may haul different loads of materials from a material plant 180 to a job site (e.g., to paving machine 100 at a roadway paving site).

As shown by reference number 520, in some implementations, the server 150 may receive plant data from a device and/or system associated with the material plant 180. The plant data may include information associated with a transport vehicle 200 and/or material loaded onto a transport vehicle 200. For example, the plant data may identify a name of the material loaded onto the transport vehicle 200, a type of material loaded onto the transport vehicle 200, a mixture of the material loaded onto the transport vehicle 200, a transport vehicle identifier (e.g., a truck identifier, a serial number, a license plate number, and/or the like) that identifies the transport vehicle 200 onto which the material is loaded, a volume of material loaded onto the transport vehicle 200, a time that the material was loaded onto the transport vehicle 200, a temperature at which the material was mixed at the material plant 180, a plant identifier that identifies the material plant 180 at which the material was mixed, a project identifier that identifies a project associated with the material (e.g., a roadway paving project and/or the like), a contractor identifier that identifies a contractor associated with the project (e.g., a contractor responsible for mixing the material, hauling the material, laying the material, paving the material, and/or the like), a job site identifier that identifies a job site to which the material is to be delivered, and/or the like.

In some implementations, the server 150 may store the plant data in association with the estimated dump location. For example, the plant data may include a transport vehicle identifier that identifies a transport vehicle 200 upon which material is loaded, and the transport vehicle 200 may include the transport vehicle identifier in the data points transmitted to the server 150, as described above in connection with FIG. 3. After estimating the dump location for the material, the server 150 may store information that identifies the estimated dump location in association with the transport vehicle identifier and/or other plant data that corresponds to the transport vehicle identifier. In this way, if an issue with paved material is later discovered (e.g., cracking, potholes, and/or the like), such plant data may be analyzed to identify a root cause of the issue, as described in more detail below.

Additionally, or alternatively, the server 150 may obtain information regarding a sample of material taken in association with a dump location. For example, a sample of the material may be taken from a recently laid roadway, and one or more properties of the material may be tested (e.g., at a lab). Information that identifies these properties and/or other information associated with testing the material may be transmitted to the server 150, and may be stored in association with a dump location associated with the testing location (e.g., a dump location nearest to a location from which the sample was taken).

As shown by reference number 530, in some implementations, the server 150 may indicate one or more dump locations and/or information associated with the dump location(s) on a map or other visual display. The map may be provided for display on a device, such as a display device associated with server 150 and/or a display device associated with a system in communication with the server 150 (e.g., a computer, a smart phone, a tablet, and/or the like).

As shown by reference number 540, in some implementations, the estimated dump locations may be midpoint locations, as described above in connection with FIG. 3, and the server 150 may indicate the midpoint locations on the map. Additionally, or alternatively, as shown by reference number 550, in some implementations, the estimated dump locations may be earliest locations or latest locations, as described above in connection with FIG. 3, and the server 150 may indicate the earliest locations and/or the latest locations on a map. In some implementations, a midpoint location (e.g., shown as a dot) may be indicated differently than an earliest location and/or a latest location (e.g., shown as a line). Additionally, or alternatively, the earliest location and the latest location may be indicated differently. As shown by reference number 560, in some implementations, a path of a transport vehicle 200 may be indicated.

In some implementations, a user (e.g., a department of transportation employee and/or the like) may discover an issue with a roadway, and may interact with a device to transmit, to the server 150, information that identifies a location associated with the issue (e.g., a location of paved material and/or the like), as shown by reference number 570. As shown by reference number 580, the server 150 may receive the information that identifies the location associated with the issue, and may determine a nearest estimated dump location to the location associated with the issue. As shown, the server 150 may output information that identifies the nearest estimated dump location, and/or may output information associated with the nearest estimated dump location, such as plant data associated with the nearest estimated dump location.

For example, as described above, the server 150 may output a name of the material dumped at the dump location, a type of material dumped at the dump location, a mixture of the material dumped at the dump location, a transport vehicle identifier that identifies the transport vehicle 200 that dumped the material at the dump location, a volume of material transported by the transport vehicle 200 and dumped in association with the dump location, a time that the material was loaded onto the transport vehicle 200, a temperature at which the material was mixed at the material plant 180, a plant identifier that identifies the material plant 180 at which the material dumped at the dump location was mixed, a project identifier that identifies a project associated with the dump location, a contractor identifier that identifies a contractor associated with the dump location, a job site identifier that identifies a job site associated with the dump location, and/or the like. The server 150 may determine this information based on a stored association between the dump location and the plant data (e.g., using the transport vehicle identifier to identify such association), as described above. In this way, the user may identify a root cause associated with the issue.

Additionally, or alternatively, the server 150 may receive data from other vehicle and/or machines associated with roadway paving, such as the paving machine 100, a compaction machine (e.g., a roller and/or the like), a transport vehicle 200, and/or the like. For example, the server 150 may receive information that identifies a temperature of the material (e.g., when loaded onto the paving machine 100, when applied to the roadway, and/or the like), a compaction pressure of the material, a compaction rate of the material, a time at which the material is dumped (e.g., which may be estimated as an earliest time, a latest time, and/or a midpoint time, in a similar manner as the earliest location, latest location, and/or midpoint location, as described elsewhere herein), and/or the like. Such information may be used to identify a root cause of the issue, in some implementations.

In some implementations, the server 150 may analyze the plant data to suggest a root cause of the issue. For example, the server 150 may determine whether an incorrect material was used (e.g., based on information that indicates the correct material to be used, based on stored information that identifies the material used at other dump locations associated with the job site, and/or the like), whether an incorrect mixture of material was used, whether the material was applied a the wrong temperature, whether the material was applied with the wrong compaction rate, and/or the like.

As indicated above, FIG. 4 is provided as an example. Other examples are possible and may differ from what was described in connection with FIG. 4.

FIG. 5 is a diagram illustrating another example process 600 performed, for example, by server 150 and/or system 300. Example process 600 is an example where server 150 and/or system 300 performs operations associated with estimating a dump location of material dumped by a transport vehicle 200.

As shown in FIG. 5, in some implementations, process 600 may include receiving information that identifies a location of a paving machine (block 610). For example, the server 150 (e.g., using one or more components of system 300) may receive information that identifies a location of a paving machine 100, as described above in connection with FIGS. 3-4.

As further shown in FIG. 5, in some implementations, process 600 may include receiving multiple data points associated with the transport vehicle, wherein each data point indicates a respective location of the transport vehicle and a corresponding time at which the transport vehicle was at the respective location (block 620). For example, the server 150 (e.g., using one or more components of system 300) may receive multiple data points associated with the transport vehicle 200, as described above in connection with FIGS. 3-4. In some implementations, each data point indicates a respective location of the transport vehicle 200 and a corresponding time at which the transport vehicle 200 was at the respective location.

As further shown in FIG. 5, in some implementations, process 600 may include identifying a subset of data points, of the multiple data points, that indicate respective locations of the transport vehicle within a threshold proximity of the location of the paving machine (block 630). For example, the server 150 (e.g., using one or more components of system 300) may identify a subset of data points, of the multiple data points, that indicate respective locations of the transport vehicle within a threshold proximity of the location of the paving machine, as described above in connection with FIGS. 3-4.

As further shown in FIG. 5, in some implementations, process 600 may include estimating the dump location of the material dumped by the transport vehicle based on at least one of: a set of locations indicated by the subset of data points, or a set of times indicated by the subset of data points (block 640). For example, the server 150 (e.g., using one or more components of system 300) may estimate the dump location of the material dumped by the transport vehicle 200, as described above in connection with FIGS. 3-4. In some implementations, the dump location may be estimated based on a set of locations indicated by the subset of data points and/or a set of times indicated by the subset of data points.

As further shown in FIG. 5, in some implementations, process 600 may include outputting information that identifies the estimated dump location (block 650). For example, the server 150 (e.g., using one or more components of system 300) may output information that identifies the estimated dump location, as described above in connection with FIGS. 3-4.

Process 600 may include additional implementations, such as any single implementation or any combination of implementations described below and/or in connection with one or more other processes described elsewhere herein.

In some implementations, the estimated dump location includes at least one of: a first location, of the set of locations, associated with an earliest time of the set of times; a second location, of the set of locations, associated with a latest time of the set of times; or a midpoint between the first location and the second location. In some implementations, the information that identifies the estimated dump location is output to indicate at least one of the first location, the second location, or the midpoint on a map.

In some implementations, the estimated dump location includes a location, of the set of locations, that corresponds to a time, of the set of times, that is a midpoint of the set of times. In some implementations, the dump location is estimated as a weighted combination of the set of locations and the set of times. In some implementations, the server 150 and/or the system 300 may estimate multiple dump locations associated with the paving machine; and may provide, for display, an indication of the multiple dump locations on a map. In some implementations, the dump location is estimated without an explicit indication that the material has been dumped.

In some implementations, the information that identifies the estimated dump location is output to indicate the estimated dump location on a map. In some implementations, estimating the dump location includes: determining a first location, of the set of locations, associated with an earliest time of the set of times; determining a second location, of the set of locations, associated with a latest time of the set of times; and estimating the dump location as a midpoint between the first location and the second location. In some implementations, estimating the dump location includes: determining a time, of the set of times, that is a midpoint of the set of times; determining a location, of the set of locations, that corresponds to the time; and estimating the dump location as the location that corresponds to the time.

In some implementations, the set of the data points are identified as being within the threshold proximity of the location of the paving machine based on at least one of: a comparison between the location of the paving machine and each location in the set of locations indicated by the set of data points, a comparison between the specific time and each time in the set of times indicated by the set of data points, or an indication that the paving machine and the transport vehicle are in communicative proximity. In some implementations, the data points are GPS data points.

In some implementations, the server 150 and/or the system 300 may receive information that identifies a location associated with paved material; may determine a nearest estimated dump location, to the location associated with the paved material, among multiple estimated dump locations that include the estimated dump location; and may output information that identifies the nearest estimated dump location and information associated with the nearest estimated dump location. In some implementations, the information associated with the nearest estimated dump location identifies at least one of: a type of material dumped at the nearest estimated dump location, a mixture of material dumped at the nearest estimated dump location, a plant identifier that identifies a plant that mixed material dumped at the nearest estimated dump location, a project identifier that identifies a project associated with the nearest estimated dump location, or a contractor identifier that identifies a contractor associated with the nearest estimated dump location.

Although FIG. 5 shows example blocks of process 600, in some implementations, process 600 may include additional blocks, fewer blocks, different blocks, or differently arranged blocks than those depicted in FIG. 5. Additionally, or alternatively, two or more of the blocks of process 600 may be performed in parallel.

INDUSTRIAL APPLICABILITY

During a paving operation, a transport vehicle 200 may dump material (e.g., bituminous material, bituminous aggregate, asphalt, and/or the like) into an assembly of a paving machine 100, such as a hopper 20. In some implementations, the paving machine 100 may push the transport vehicle 200 as the material is being dumped into the hopper 20 and/or as a paving operation is being performed to lay material for a roadway mat. Thus, the material dumped by the transport vehicle 200 may be spread substantially uniformly over an area of the roadway mat. By receiving signals that indicate a time and location of the paving machine 100 and the transport vehicle 200 during such a paving operation, the server 150 and/or system 300 described herein may estimate a dump location where the material was dumped onto the paving machine 100, may associate the dump location with other information associated with the paving operation, and may use such information to identify root causes of issues that may later arise in connection with the roadway mat.

The detailed description of example implementations of the disclosure herein makes reference to the accompanying drawings and figures, which show the example implementations by way of illustration only. While these example implementations are described in sufficient detail to enable those skilled in the art to practice the disclosure, it should be understood that other implementations may be realized, and that logical and mechanical changes may be made without departing from the spirit and scope of the disclosure. It will be apparent to a person skilled in the pertinent art that this disclosure can also be employed in a variety of other applications. Thus, the detailed description herein is presented for purposes of illustration only and not of limitation.

What is claimed is:

1. A method of estimating a dump location of material dumped by a transport vehicle, comprising:
    receiving, by a server, information that identifies a location of a paving machine at a specific time;
    receiving, by the server, multiple data points associated with the transport vehicle, wherein each data point indicates a respective location of the transport vehicle and a corresponding time at which the transport vehicle was at the respective location;
    identifying, by the server, a set of data points, of the multiple data points, that indicate respective locations of the transport vehicle within a threshold proximity of the location of the paving machine within a time period that includes the specific time;

estimating, by the server, the dump location of the material dumped by the transport vehicle based on at least one of:
  a set of locations indicated by the set of data points, and
  a set of times indicated by the set of data points; and providing for display, by the server and on a display device associated with the server, information that identifies the estimated dump location based on estimating the dump location.

2. The method of claim 1, wherein the information that identifies the estimated dump location is provided for display to indicate the estimated dump location on a map.

3. The method of claim 1, wherein estimating the dump location comprises:
  determining a first location, of the set of locations, associated with an earliest time of the set of times;
  determining a second location, of the set of locations, associated with a latest time of the set of times; and
  estimating the dump location as a midpoint between the first location and the second location.

4. The method of claim 1, wherein estimating the dump location comprises:
  determining a time, of the set of times, that is a midpoint of the set of times;
  determining a location, of the set of locations, that corresponds to the time; and
  estimating the dump location as the location that corresponds to the time.

5. The method of claim 1, wherein the dump location is estimated as a weighted combination of at least one of the set of locations or the set of times.

6. The method of claim 1, wherein the set of the data points are identified as being within the threshold proximity of the location of the paving machine based on at least one of:
  a comparison between the location of the paving machine and each location in the set of locations indicated by the set of data points,
  a comparison between the specific time and each time in the set of times indicated by the set of data points, or
  an indication that the paving machine and the transport vehicle are in communicative proximity.

7. The method of claim 1, further comprising:
  receiving information that identifies a location associated with paved material;
  determining a nearest estimated dump location, to the location associated with the paved material, among multiple estimated dump locations that include the estimated dump location; and
  outputting information that identifies the nearest estimated dump location and information associated with the nearest estimated dump location.

8. The method of claim 7, wherein the information associated with the nearest estimated dump location identifies at least one of:
  a type of material dumped at the nearest estimated dump location,
  a mixture of material dumped at the nearest estimated dump location,
  a plant identifier that identifies a plant that mixed material dumped at the nearest estimated dump location,
  a project identifier that identifies a project associated with the nearest estimated dump location, or
  a contractor identifier that identifies a contractor associated with the nearest estimated dump location.

9. The method of claim 1, wherein the dump location is estimated without an explicit indication that the material has been dumped.

10. A system for estimating a dump location of material dumped by a transport vehicle, comprising:
  a memory; and
  one or more processors configured to:
    receive information that identifies a location of a paving machine;
    receive multiple data points associated with the transport vehicle, wherein each data point indicates a respective location of the transport vehicle and a corresponding time at which the transport vehicle was at the respective location;
    identify a subset of data points, of the multiple data points, that indicate respective locations of the transport vehicle within a threshold proximity of the location of the paving machine;
    estimate the dump location of the material dumped by the transport vehicle based on at least one of:
      a set of locations indicated by the subset of data points, or
      a set of times indicated by the subset of data points; and
    provide for display, on a display device associated with the system, information that identifies the estimated dump location based on estimating the dump location.

11. The system of claim 10, wherein the estimated dump location includes at least one of:
  a first location, of the set of locations, associated with an earliest time of the set of times,
  a second location, of the set of locations, associated with a latest time of the set of times, or
  a midpoint between the first location and the second location.

12. The system of claim 11, wherein the information that identifies the estimated dump location is provided for display to indicate at least one of the first location, the second location, or the midpoint on a map.

13. The system of claim 10, wherein the estimated dump location includes a location, of the set of locations, that corresponds to a time, of the set of times, that is a midpoint of the set of times.

14. The system of claim 10, wherein the dump location is estimated as a weighted combination of the set of locations and the set of times.

15. A non-transitory computer-readable medium storing instructions for estimating a dump location of material dumped by a first vehicle, the instructions comprising:
  one or more instructions that, when executed by one or more processors, cause the one or more processors to:
    receive information that identifies a location of a second vehicle;
    receive multiple data points associated with the first vehicle, wherein each data point indicates a respective location of the first vehicle and a corresponding time at which the first vehicle was at the respective location;
    identify a subset of data points, of the multiple data points, that indicate respective locations of the first vehicle within a threshold proximity of the location of the second vehicle;
    estimate the dump location of the material dumped by the first vehicle based on at least one of:
      a set of locations indicated by the subset of data points, or a set of times indicated by the subset of data points; and provide for display, on a display device associated with the one or more processors, information that identifies the estimated dump location based on estimating the dump location.

16. The non-transitory computer-readable medium of claim 15, wherein the estimated dump location includes at least one of:

a first location, of the set of locations, associated with an earliest time of the set of times, a second location, of the set of locations, associated with a latest time of the set of times, or a midpoint between the first location and the second location.

17. The non-transitory computer-readable medium of claim 15, wherein the information that identifies the estimated dump location is provided for display to indicate the estimated dump location on a map.

18. The non-transitory computer-readable medium of claim 15, wherein the multiple data points are multiple global positioning system (GPS) data points.

19. The non-transitory computer-readable medium of claim 15, wherein the first vehicle is a transport vehicle and the second vehicle is a paving machine.

20. The system of claim 10, wherein the dump location is estimated without receiving an explicit indication from the paving machine or the transport vehicle that the material has been dumped.

* * * * *